United States Patent [19]

Dhyanchand

[11] Patent Number: 5,015,941
[45] Date of Patent: May 14, 1991

[54] POWER CONVERSION SYSTEM WITH BI-DIRECTIONAL POWER CONVERTER HAVING PRIME MOVER START CAPABILITY

[75] Inventor: P. John Dhyanchand, Rockford, Ill.

[73] Assignee: Sundstrand Corporation, Rockford, Ill.

[21] Appl. No.: 428,969

[22] Filed: Oct. 30, 1989

[51] Int. Cl.⁵ ............................ F02N 11/04; H02P 9/04
[52] U.S. Cl. ..................................... 322/10; 290/38 R; 290/46
[58] Field of Search ............................ 322/10, 11, 29; 290/38 R, 46

[56] References Cited

U.S. PATENT DOCUMENTS

| | | | |
|---|---|---|---|
| 3,908,161 | 9/1975 | Messenger | 322/29 |
| 4,330,743 | 5/1982 | Glennon | 322/10 |
| 4,697,090 | 9/1987 | Baker et al. | 290/38 R |
| 4,743,777 | 5/1988 | Shilling et al. | 290/46 |
| 4,786,852 | 11/1988 | Cook | 322/10 |
| 4,939,441 | 7/1990 | Dhyanchand | 290/46 X |
| 4,948,209 | 8/1990 | Baker et al. | 322/10 |
| 4,968,926 | 11/1990 | Dhyanchand | 322/10 |

Primary Examiner—R. J. Hickey
Attorney, Agent, or Firm—Marshall, O'Toole, Gerstein, Murray & Bicknell

[57] ABSTRACT

A power conversion system utilizes a brushless generator driven by a prime mover when operating in a generating mode and drives the prime mover when operating in a starting mode. The system includes first and second bidirectional converter/inverter units, each of the bidirectional units being operable as either an AC to DC converter or a DC to AC inverter. A DC link couples the first and second bidirectional units. A transformer is connected to the second unit and the first unit is further connected to the armature windings, the transformer further being connected to the external power source. A control unit is connected to the first and second bidirectional units and causes the first bidirectional unit to operate as a converter and the second bidirectional unit to operate as an inverter when operating in the generating mode, and for causing the first bidirectional unit to operate as an inverter and the second bidirectional unit to operate as a converter when operating in the starting mode.

5 Claims, 3 Drawing Sheets

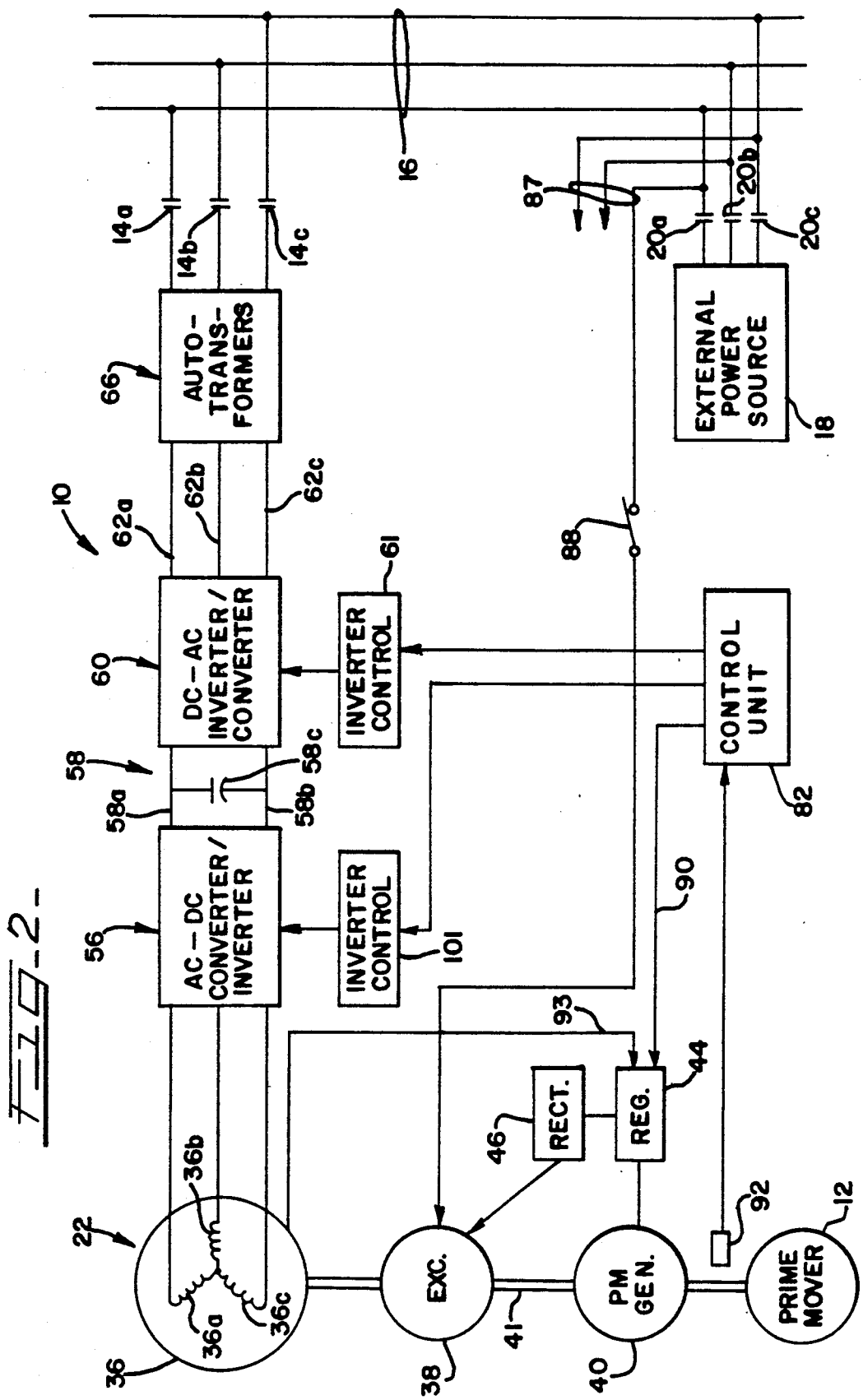

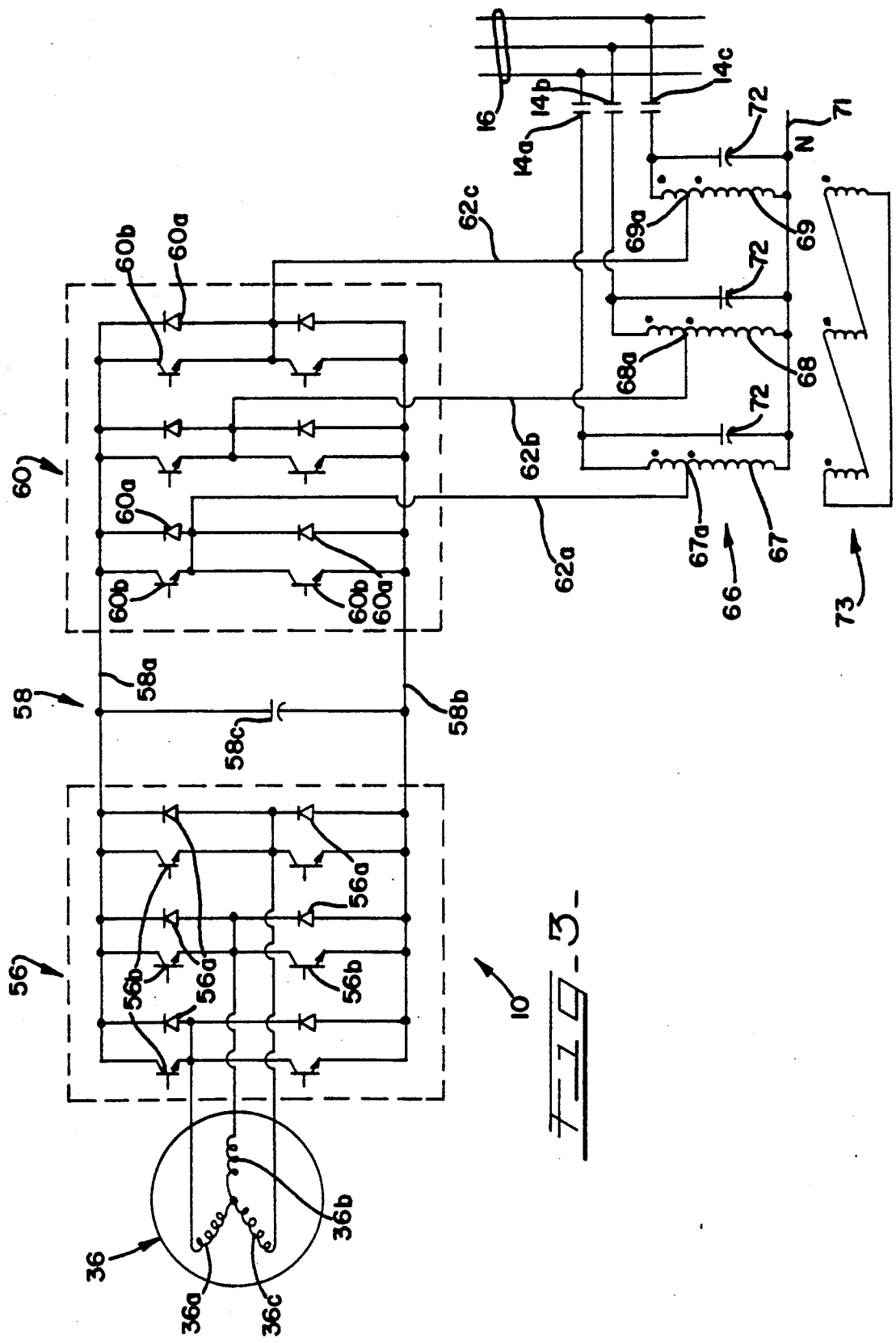

POWER CONVERSION SYSTEM WITH BI-DIRECTIONAL POWER CONVERTER HAVING PRIME MOVER START CAPABILITY

TECHNICAL FIELD

The present invention relates generally to power conversion systems, and more particularly to such systems which may be used either in a generating mode to convert mechanical power from a prime mover into electrical power or in a starting mode to convert electrical power into motive power for starting the prime mover.

BACKGROUND ART

In a power conversion system such as a variable speed, constant frequency (VSCF) power generating system, a brushless, three-phase synchronous generator operates in a generating mode to convert variable speed motive power supplied by a prime mover into variable frequency AC power. The variable frequency power is rectified and provided over a DC link to a controllable static inverter. The inverter is operated to produce constant frequency AC power, which is then supplied over a load bus to one or more loads.

As is known, such a generator can also be operated as a motor in a starting mode to convert electrical power supplied by an external AC power source into motive power which may in turn be provided to the prime mover to bring it up to self-sustaining speed. In the case of a brushless, synchronous generator including a permanent magnet generator (PMG), an exciter portion and a main generator portion mounted on a common shaft, it has been known to provide power at a controlled voltage and frequency to the armature windings of the main generator portion and to provide field current to the main generator portion via the exciter portion so that the motive power may be developed. This has been accomplished in the past, for example, using two separate inverters, one to provide power to the main generator portion armature windings and the other to provide power to the exciter portion.

The Cook U.S. Pat. No. 4,786,852, assigned to the assignee of the instant invention, discloses a power conversion system including a starting arrangement in which a brushless generator is operated as a motor to bring an engine up to self-sustaining speed. A rectifier bridge of a VSCF system is modified by adding transistors in parallel with the rectifiers of the bridge and the transistors are operated during a starting mode of operation to convert DC power provided on a DC link by a separate VSCF system or auxiliary power unit into AC power. The AC power is applied to armature windings of the brushless generator to cause a rotor of the generator to be accelerated. A disadvantage with the Cook arrangement is that DC power must be available in order to operate in the starting mode.

The Shilling et al., U.S. Pat. No. 4,743,777, discloses a starter generator system including a brushless, synchronous generator. The system is operable in a starting mode to produce motive power from electrical power provided by an external AC power source. An exciter of the generator includes separate DC and three-phase AC field windings disposed in a stator. When operating in a starting mode at the beginning of a starting sequence, the AC power developed by the external AC power source is directly applied to the three-phase AC exciter field windings. The AC power developed by the external AC source is further provided to a variable voltage, variable frequency power converter which in turn provides a controlled voltage and frequency to the armature windings of a main generator. The power converter is capable of being alternatively connected by sets of contactors to drive the dynamoelectric machine as a starting motor or to receive electrical power from the machine during generator operation. The AC power provided to the AC exciter field windings is transferred by transformer action to exciter armature windings disposed on a rotor of the generator. This AC power is rectified by a rotating rectifier and provided to a main field winding of the generator. The interaction of the magnetic fields developed by the main generator field winding and armature windings in turn causes the rotor of the generator to rotate and thereby develop the desired motive power. When the generator is operated in a generating mode, switches are operated to disconnect the AC exciter field windings from the external AC source and to provide DC power to the DC exciter field winding. The power converter is thereafter operated to produce AC output power at a fixed frequency.

Messenger, U.S. Pat. No. 3,908,161 discloses a brushless generator including three exciter field windings which are connected in a wye configuration and are provided with three-phase AC power during operation in a starting mode. The three-phase AC power induces AC power in an exciter armature winding which is rectified and applied to a main generator field winding. Main armature windings receive controlled AC power from a cyclo converter to in turn cause rotation of the generator rotor. Thereafter, the three exciter field windings are connected in series and provided with DC excitation when operating in a generating mode.

SUMMARY OF THE INVENTION

In accordance with the present invention, an improved system is provided for generation of AC power and for starting of a prime mover.

More particularly, a power conversion system utilizing a brushless generator having armature windings and driven by a prime mover includes an AC/DC power converter coupled to the windings, a DC link coupled to the AC/DC power converter, an inverter coupled to the DC link, and a transformer coupled to the inverter. When operating in the generating mode, the inverter develops at least one AC voltage which is provided by the second transformer to an AC load.

The system is also operable in a starting mode to convert AC power supplied by an external AC source into motive power for starting the prime mover. The external AC source is coupled to the transformers and directly to the inverter. The inverter includes switching transistors which are operated by an inverter control to convert DC to AC power when in the generating mode; the inverter further includes diodes connected across the transistors in a bridge arrangement to convert AC to DC power when in the starting mode. Likewise, the converter includes parallel pairs of switching transistors and diodes, and it operates to convert AC to DC power during the generating mode and to convert DC to AC power during the starting mode. Thus, both the converter and the inverter are bidirectional. The transformers adjust the voltage levels during both generating and starting modes.

BRIEF DESCRIPTION OF THE DRAWINGS

FIG. 2 shows a combined mechanical and electrical block diagram of the power generating system shown in FIG. 1; and FIG. 3 is a simplified schematic diagram of the electrical power converter components, together with the generator armature windings.

DESCRIPTION OF THE PREFERRED EMBODIMENT

Figure 1:
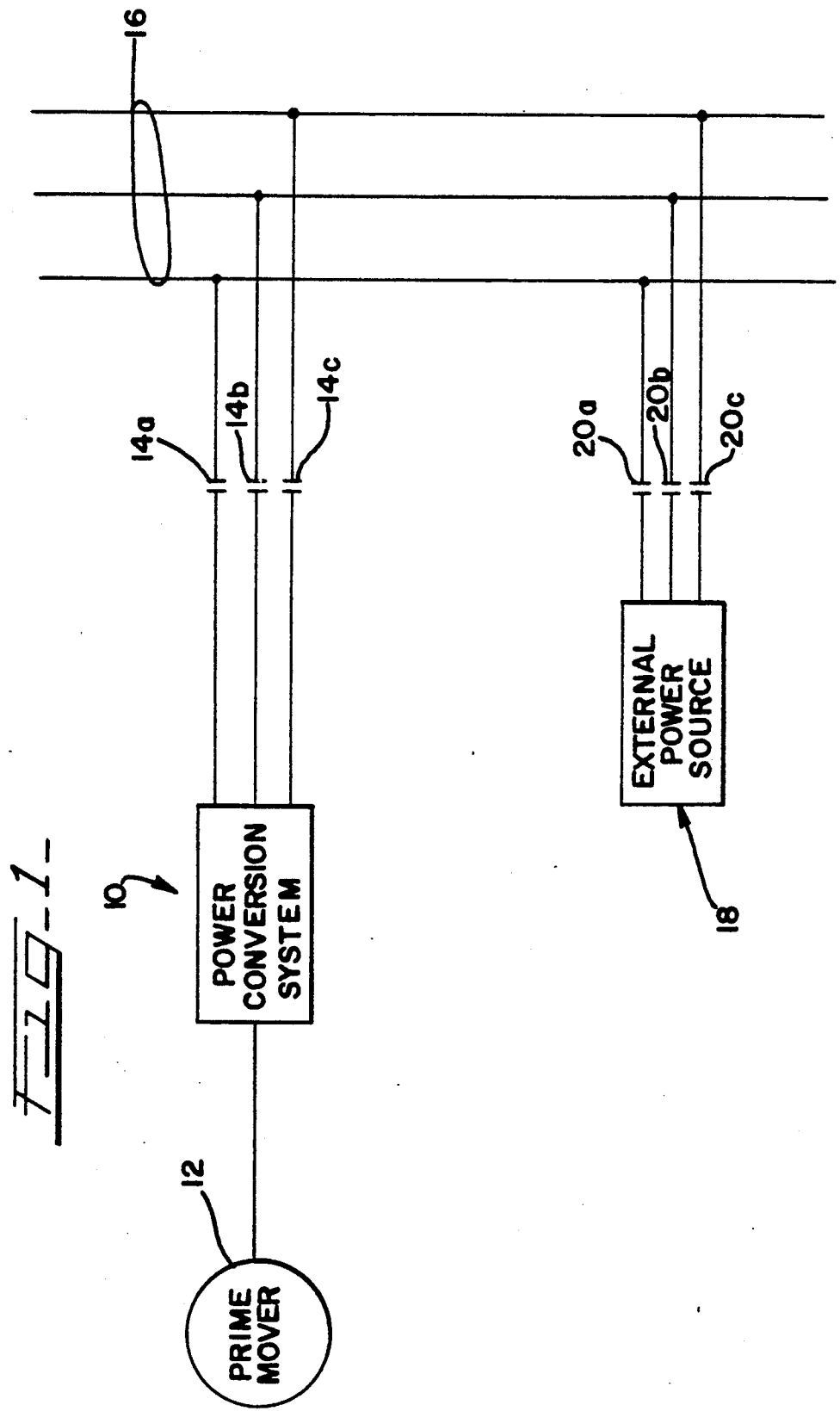
FIG. 1 is a block diagram of a power generating system incorporating the present invention.

Referring now to FIG. 1, a power conversion system 10 in the form of a variable speed, constant frequency (VSCF) system operates in a generating mode to convert variable speed motive power produced by a prime mover 12, such as an aircraft jet engine, into constant frequency three-phase AC electrical power which is delivered through controllable contactors 14a, 14b and 14c to a load bus 16. The VSCF system 10 is also operable in a starting mode using three-phase AC power provided by an external power source 18, such as a ground power cart, which, in the starting mode, is coupled to the system 10 through controllable contactors 20a-20c. The source 18 is connected to the conversion system 10 through the contactors 20a to 20c, the bus 16, and the contactors 14a to 14c. Alternatively, the electrical power for use by the VSCF system 10 in the starting mode may be provided by another source of power, such as another VSCF system which is driven by a different prime mover. In any event, the VSCF system 10 converts electrical power into motive power when operating in the starting mode to bring the prime mover 12 up to self-sustaining speed. Once this self-sustaining speed (also referred to as "light-off") is reached, the prime mover 12 may be accelerated to operating speed, following which operation in the generating mode may commence.

Referring now to FIG. 2 which shows the system in greater detail, the VSCF system 10 includes a generator 22 driven by the prime mover 12. Preferably, the generator 22 is of the brushless, synchronous type, although a different generator may be used, such as a permanent magnet generator.

The generator 22 includes a main generator portion 36 including three armature windings 36a, 36b, and 36c, an exciter portion 38 and a permanent magnet generator (PMG) 40, all of which include rotor structures mounted on a common shaft 41 of a rotor. In the generating mode of operation, rotation of the common shaft 41 by the prime mover 12 causes polyphase power to be developed in armature windings of the PMG 40 which is in turn delivered to a voltage regulator 44. The voltage regulator 44 and a rectifier 46 deliver a controlled magnitude of DC current to field windings of the exciter 38. This current induces an AC voltage in armature windings of the exciter 38 which is rectified by a rotating rectifier. The resulting DC power from the exciter 38 is supplied to a field winding (not shown) of the main generator 36. Rotation of the common shaft 41 while the field current is flowing in the field winding of the main generator portion 36 causes polyphase voltages to be developed in the armature windings 36a, 36b and 36c of the main generator portion 36. The frequency of these voltages varies with the speed of the shaft 41.

When operating in the generating mode, these voltages are supplied to the input of a bidirectional AC/DC power converter 56, and the latter converts the AC power into first and second DC potentials on first and second conductors 58a and 58b of a DC link 58. A filter capacitor 58c is connected across the conductors 58a and 58b.

The DC power on the DC link 58 is provided to a bidirectional AC/DC inverter 60 which produces substantially constant frequency three-phase AC power on three conductors 62a, 62b and 62c.

The three conductors 62a, 62b and 62c connect the inverter output to a set of auto transformers 66. The transformer outputs, in turn, are connected by the contactors 14a, 14b and 14c to the load bus 16. As previously mentioned, in the generating mode the rotating prime mover 12 provides the energy to produce the constant frequency voltage on the load bus 16. During this operation, the contactors 14a, 14b and 14c are closed and the contactors 20a, 20b and 20c leading to the external power source 18 are opened.

With reference to FIG. 3, the converter 56 is formed by a plurality of power diodes 56a connected in a bridge arrangement to form a three-phase rectifier. Connected in parallel with each diode 56a is a switching transistor 56b; the collector-emitter terminals of each transistor 56b are connected to conduct current in the opposite direction to the current flow in the associated diode. The bases of the transistors are connected to an inverter control 101 shown in FIG. 2. As will be further described hereinafter, the converter 56 functions to convert AC to DC using the diodes 56a when in the generating mode, and functions to convert DC to AC using the transistors 56b when in the starting mode.

The inverter 60 is constructed similarly to the converter 56, and includes power diodes 60a connected in a bridge arrangement and transistors 60b connected in parallel with the diodes 60a. The bases of the transistors 60b are connected to an inverter control 61 (FIG. 2). The inverter 60 functions to convert DC to AC during the generating mode using the transistors 60b, and functions to convert AC to DC during the starting mode using the diodes 60a.

With reference to FIG. 3, the set of auto transformers 66 comprises three transformer windings 67, 68 and 69, each winding having one end connected to a neutral or ground 71 and another end connected through the contactors 14a-14c to one of the three conductors of the load bus 16. The conductors 62a-62c are connected to intermediate taps 67a, 68a and 69a of the windings 67-69. A capacitor 72 is connected across each winding 67-69. Tertiary windings 73 are also magnetically linked with the autotransformer windings 67-69 to maintain the output voltages at balanced levels during unbalanced load conditions.

With reference to FIGS. 2 and 3, during operation in the generating mode, assuming that the prime mover 12 is running at a self-sustaining speed, the generator 36 armature windings 36a, 36b, and 36c are coupled to the converter 56. A control unit 82 causes the inverter control 101 to bias off the transistors 56b, with the result that the rectifier bridge formed by the diodes 56a converts the variable frequency three-phase AC to DC power. The resulting DC power on the DC link is converted by the inverter 60 into constant-frequency AC power under control of the inverter control 61. In the generating mode, the diodes 60a function as flyback diodes. The output of the inverter 60 is coupled by the conductors 62a–62c to the taps 67a–69a of the auto transformers 66 (which function as step-up transformers in the generating mode), and the closed contactors 14a–14c to the load bus 16. The contactors 20a to 20c may be open during the generating mode.

During operation in the starting mode, assume that the prime mover 12 is initially at standstill and the contactors 14a, 14b, 14c, 20a, 20b and 20c are closed. AC power flows from the external power source 18 through the transformers 66 to the inverter 60. The control unit 82 actuates the inverter control 61 to bias off the transistors 60b, and the diodes 60a function to produce DC power on the DC link 58. The auto transformers 66 step down the voltage level to the appropriate value for starting.

During the starting mode, the control unit 82 commands the inverter control to operate the transistors 56b as an inverter and produce an output voltage and frequency which starts at a low value and gradually increases at a constant volts-per-hertz ratio. The diodes 56a function as flyback diodes. The AC power is coupled to the armature windings 36a, 36b and 36c of the main generator 36.

In the starting mode, the source 18 is also connected by lines 87 to the three-phase windings in the exciter 38 by closing a switch 88, so that main field current for the generator 36 is developed. The exciter 38 is provided with three-phase windings connected to the lines 87 as well as a DC winding (connected to the rectifier 46), and the exciter 38 may also include a converter/inverter connected between the source 18 and the three-phase windings. This generation of the main field current together with the power to the armature windings 36a, 36b and 36c cause the shaft 41 to rotate and drive the prime mover 12. When the prime mover 12 reaches the self-sustaining speed, a rotational speed sensor 92 adjacent the shaft 41 signals the control unit 82 to open the switch 88. The control unit 82 also actuates the inverter controls 61 and 101 to cause the unit 56 to operate as a converter and the unit 60 to operate as an inverter. The system then continues in operation in the generating mode.

The control unit 82 is also connected by a line 90 to the voltage regulator 44 to enable the regulator 44 to provide exciter field current to the exciter 38 after the prime mover 12 has reached self-sustaining speed and the system is switched to the generating mode. A line 93 also connects the output of the generator 36 to the voltage regulator 44. In the generating mode, a signal representing the magnitude of the generator 36 output voltage appears on the line 93, and the regulator 44 controls the exciter field current to the exciter 38 in order to hold or regulate the generator 36 output voltage.

It should be noted that the inverter controls 61 and 101 and the control unit 82 may be implemented by software or hardware or both, and the designs of such circuits are straightforward given the description contained herein.

The system is advantageous because of its simplicity and the resulting reliability, because the same converter and inverter are used in both modes of operation without the need for switch connections to them.

I claim:

1. A power conversion system operable in a generating mode to convert motive power into electrical power and in a starting mode to convert electrical power into motive power utilizing an external power source and a generator having armature windings, comprising:

first and second bidirectional means, each of said bidirectional means being operable as either an AC to DC converter or a DC to AC inverter;

a DC link coupling said first and second bidirectional means;

transformer means connected to said second means;

said first bidirectional means further being adapted to be connected to said armature windings, and said transformer means further being adapted to be connected to the external power source; and control means connected to said first and second bidirectional means for causing said first bidirectional means to operate as a converter and said second bidirectional means to operate as an inverter when operating in said generating mode, and for causing said first bidirectional means to operate as an inverter and said second bidirectional means to operate as a converter when operating in said starting mode.

2. The power conversion system of claim 1, wherein said transformer means is an autotransformer 3. The power conversion system of claim 1, wherein said transformer means operates as a step-up transformer when in said generating mode and operates as a step-down transformer when in said starting mode.

4. The power conversion system of claim 1, wherein each of said first and second bidirectional means comprises a plurality of diodes connected in a rectifier bridge arrangement, and a switching transistor connected in parallel with each of said diodes, said control means being connected to control operation of said transistors.

5. The power conversion system of claim 1, and further including means adapted to be connected to said external power source and to said generator for providing a field current to said generator when operating in said starting mode.

* * * * *